United States Patent
Payonk et al.

(10) Patent No.: US 8,103,061 B2
(45) Date of Patent: Jan. 24, 2012

(54) METHOD AND APPARATUS FOR IDENTIFYING FACIAL REGIONS

(75) Inventors: Gregory Payonk, Flanders, NJ (US); Dick Jackson, Victoria (CA)

(73) Assignee: Johnson & Johnson Consumer Companies, Inc., Skillman, NJ (US)

( * ) Notice: Subject to any disclaimer, the term of this patent is extended or adjusted under 35 U.S.C. 154(b) by 1104 days.

(21) Appl. No.: 11/863,323

(22) Filed: Sep. 28, 2007

(65) Prior Publication Data

US 2008/0080746 A1    Apr. 3, 2008

Related U.S. Application Data

(60) Provisional application No. 60/848,741, filed on Oct. 2, 2006.

(51) Int. Cl.
G06K 9/00    (2006.01)
(52) U.S. Cl. ............... 382/117; 382/118; 382/190
(58) Field of Classification Search .......... 382/118, 382/117, 190
See application file for complete search history.

(56) References Cited

U.S. PATENT DOCUMENTS

| | | | |
|---|---|---|---|
| 4,911,544 A | 3/1990 | Walsh | |
| 5,016,173 A | 5/1991 | Kenet et al. | |
| 5,331,551 A | 7/1994 | Tsuruoka et al. | |
| 6,018,586 A | 1/2000 | Kamei | |
| 6,081,612 A | 6/2000 | Gutkowicz-Kusin et al. | |
| 6,148,092 A | 11/2000 | Qian | |
| 6,208,749 B1 | 3/2001 | Gutkowicz-Kusin et al. | |
| 6,215,893 B1 | 4/2001 | Leshem et al. | |
| 6,317,624 B1 | 11/2001 | Kollias et al. | |
| 6,419,638 B1* | 7/2002 | Hay et al. ............... | 600/558 |
| 6,436,127 B1 | 8/2002 | Anderson et al. | |
| 6,619,860 B1 | 9/2003 | Simon | |
| 6,624,843 B2 | 9/2003 | Lennon | |
| 2002/0181752 A1 | 12/2002 | Wallo et al. | |
| 2003/0045916 A1 | 3/2003 | Anderson et al. | |
| 2003/0067545 A1 | 4/2003 | Giron et al. | |
| 2003/0086703 A1 | 5/2003 | Kollias et al. | |
| 2003/0086712 A1 | 5/2003 | Merola et al. | |
| 2003/0138249 A1 | 7/2003 | Merola et al. | |
| 2004/0125996 A1 | 7/2004 | Eddowes et al. | |
| 2004/0146290 A1 | 7/2004 | Kollias et al. | |
| 2005/0116039 A1* | 6/2005 | Zhu et al. ............... | 235/462.08 |

(Continued)

FOREIGN PATENT DOCUMENTS

EP    0737932    10/1996

(Continued)

OTHER PUBLICATIONS

Gartstein, et al., "Assessment of Visual Signs of Skin Aging", Bioengineering of the Skin: Skin Surface Imaging and Analysis, Chapter 3, 1997, pp. 331-345.

(Continued)

*Primary Examiner* — Vu Le
*Assistant Examiner* — Michael Vanchy, Jr.
(74) *Attorney, Agent, or Firm* — Paul F. Swift

(57) ABSTRACT

An apparatus and method for identifying facial regions in an image includes a computer running a program that tests pixel values of an image to identify objects therein having attributes like pupils, such as shape, size, position and reflectivity. To reduce the time to identify pupils, the image is sub-rected, sub-sampled and only one color/brightness channel is tested.

16 Claims, 7 Drawing Sheets

U.S. PATENT DOCUMENTS

| | | |
|---|---|---|
| 2005/0129288 A1* | 6/2005 | Chen et al. .................... 382/118 |
| 2005/0180611 A1* | 8/2005 | Oohashi et al. ............... 382/118 |
| 2005/0195316 A1 | 9/2005 | Kollias et al. |
| 2005/0287040 A1 | 12/2005 | Gebler |
| 2006/0092315 A1 | 5/2006 | Payonk et al. |

FOREIGN PATENT DOCUMENTS

| | | |
|---|---|---|
| EP | 1297782 | 4/2003 |
| EP | 1433418 | 6/2004 |
| WO | WO 98/37811 | 9/1998 |
| WO | WO 99/17668 | 4/1999 |
| WO | WO 00/76398 | 12/2000 |
| WO | WO 01/35827 | 5/2001 |

OTHER PUBLICATIONS

Hillebrand, et al., "Quantitative Evaluation of Skin Condition in an Epidemiological Survey of Females Living in Northern Versus Southern Japan", Journal of Dermatologic Science, vol. 27, Supp. 1, 2001, pp. S42-S52.

Intl. Search Report from Intl. Appln. No. PCT/US 07/80032, Feb. 23, 2008.

Intl. Search Report from Intl. Appln. No. PCT/US 07/80034, May 30, 2011.

English translation of Office Action dated May 30, 2011 issued in Russian Patent Application No. 2009116641/08.

* cited by examiner

METHOD AND APPARATUS FOR IDENTIFYING FACIAL REGIONS

CROSS-REFERENCE TO RELATED APPLICATIONS

This application claims the benefit of U.S. Provisional Patent Application Ser. No. 60/848,741 filed Oct. 2, 2006, the disclosure of which is incorporated herein by reference in its entirety.

FIELD OF THE INVENTION

The present invention relates to apparatus and methods for analyzing the skin and more particularly to digital imaging and identification and analysis of specific facial regions of interest.

BACKGROUND OF THE INVENTION

Various imaging systems have been proposed that photographically capture images of a person's face for analysis of the health and aesthetic appearance of the skin. Different images, e.g., captured at different times or under different lighting conditions could be compared to one another to gain insight into the condition of the skin, e.g., at different times, such as before and after treatment, in order to ascertain trends in the condition of the skin. This was typically done by human operators inspecting the photographs to ascertain changes between them, based on color, texture, etc. In analyzing the skin of a person's face, it is beneficial to examine specific regions of the face for specific associated attributes, since the different regions of the face are specialized in form and function and interact with the environment differently. For example, the skin covering the nose is exposed to the most direct and intense rays of the sun, i.e., those emitted from late morning to early afternoon and therefore has a greater number of sebaceous glands and pores to provide skin oils to prevent the skin of the nose from burning and drying out. In contrast, the skin of the eyelids is shielded from the sun due to the bunching of the eyelid and retraction into the eye socket when the eye is open. Unlike the skin of the nose or cheek regions, the eyelids must be thin and flexible with numerous folds to facilitate the rapid opening and closing of the eye.

Because imaging is now usually conducted with a digital camera, the resultant images are subject to quantitative analysis. Quantitative image analysis is more informative if conducted recognizing the specialization of skin in different facial regions. Some skin imaging systems utilize a trained human operator to identify facial regions by manually touching (on a touch-sensitive input/output screen) or pointing to (with a cursor and clicking or indicating) fiducial points on a displayed facial image. Alternatively, polygons may be drawn on an image (with a cursor/mouse or stylus) to identify the facial regions of interest. For example, the cheek area could be denoted using lines connecting facial fiducial reference points such as the corner of the nose, the corner of the lip, the ear, the lateral edge of the eye and back to the corner of the nose. While effective, such manual operations are labor intensive and require trained operators. It would therefore be beneficial to identify facial regions on images automatically to increase the speed and consistency of identification of the facial regions and to decrease the reliance upon operator input.

SUMMARY OF THE INVENTION

The disadvantages and limitations of known apparatus and methods for identifying facial regions on images of a person's face are overcome by the present invention, which includes a recognition that the pupils/corneas of a subject may be used as reference points to identify facial regions. Apparatus and methods are disclosed for automatically identifying the pupils/corneas in the image of a subject by testing pixel values to identify objects in an image having the characteristics of pupils or pupil-like fiducial reference points, such as flash glints, etc. The identification of these reference points permits the location of facial regions to be identified.

DETAILED DESCRIPTION OF THE INVENTION

Figure 1:
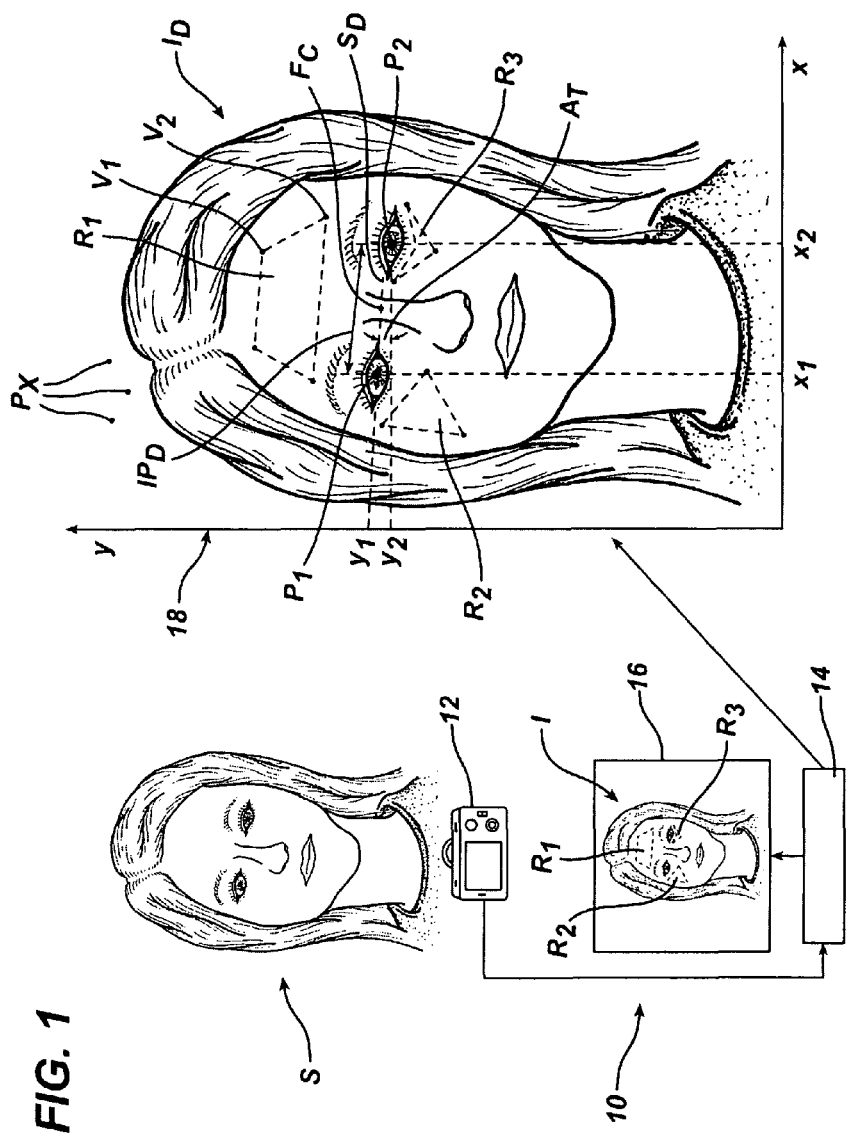
FIG. 1 is a schematic representation of image capturing apparatus and the resultant image captured thereby.

FIG. 1 shows a human subject S whose image is being captured by an imaging system 10 in accordance with the present invention. The imaging system 10 has a digital camera 12, which captures an image in digital form and communicates the digital image data to a computer 14, e.g., a personal computer. The computer 14 then displays the image I on a display 16. Imaging systems of this type are disclosed in the following U.S. patent applications: U.S. patent application Ser. No. 10/008,753, entitled, "Method of Taking Images of the Skin Using Blue Light and the Use Thereof", which was published as United States Application Publication No. US 2004/0146290 A1, U.S. patent application Ser. No. 10/978,284 entitled "Apparatus for and Method of Taking and Viewing Images of the Skin," which was published as United States Patent Application Publication No. US 2005/0195316 A1, application Ser. No. 11/169,813 entitled "Skin Imaging System with Probe", which was published as United States Application Publication No. US 2006/0092315 A1, all of which are incorporated by reference herein in their entirety.

The image data $I_D$ defining the image I is in the form of pixel intensity data for each of an array of display pixels $P_X$, which may be identified by their location on an X-Y grid 18. The image data $I_D$ informs a computer, e.g., 14, which pixels to illuminate on a display 16 and the intensity of illumination (greyscale) of each pixel at location $(X_i, Y_i)$ in order to reproduce the image I. As noted above, it is desirable to be able to identify facial regions, e.g., as shown by dashed polygons $R_1$, $R_2$, $R_3$. The present invention recognizes that facial regions, e.g., $R_1$, $R_2$, $R_3$ may be identified by calculating their location and shape if the location of both of the subject person's pupils $P_1$, $P_2$ is known. More particularly, given that the center of pupil $P_1$ is located at $X_1, Y_1$ and that the center of pupil $P_2$ is $X_2, Y_2$, the interpupilary distance $IP_D$, the facial center $F_C$ (midpoint of the line joining the pupils $P_1$, $P_2$ and the facial tilt angle $A_T$ may be calculated. The semi-distance $S_D$ is defined as ½ the interpupilary distance $IP_D$. Given empirical data of a population of interest, such as, all human beings, females aged 13 to 75, or Japanese females aged 16 to 65, the standard shape and standard locations of pertinent facial regions, e.g., $R_1, R_2, R_3$ can be defined relative to the facial center $F_C$/pupils $P_1, P_2$, e.g., in terms of the distances of the vertices, e.g., $V_1$, $V_2$ . . . etc. defining the polygons representing the facial regions $R_1$, $R_2$, $R_3$ from the facial center $F_C$ and/or the pupils $P_1$, $P_2$, given the tilt angle $A_T$. The displacement of the vertices $V_1$, $V_2$ . . . can be expressed in relative terms, e.g., as fractions or multiples of the semi-distance $S_D$. In this manner, the image need not be related to standard metrics units. Alternatively, since the images are typically taken at a controlled distance, the X, Y location of the pupils could readily be converted into standard units of measurement, such as inches or centimeters by way of comparison to a photographed ruler.

Figure 2A:
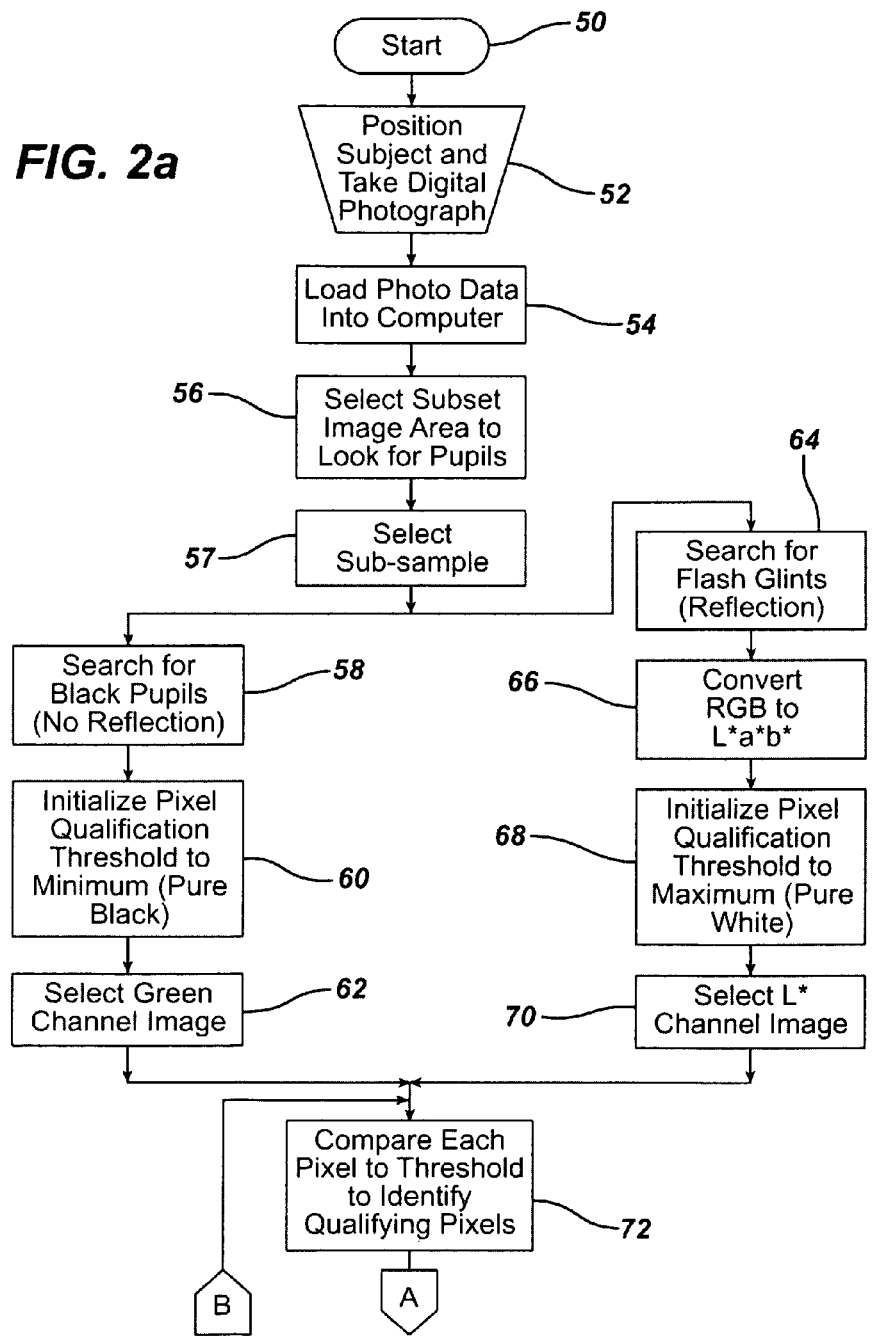
FIGS. 2a and 2b are portions of a flowchart illustrating a process in accordance with an embodiment of the present invention for automatically identifying facial regions.
Figure 2B:
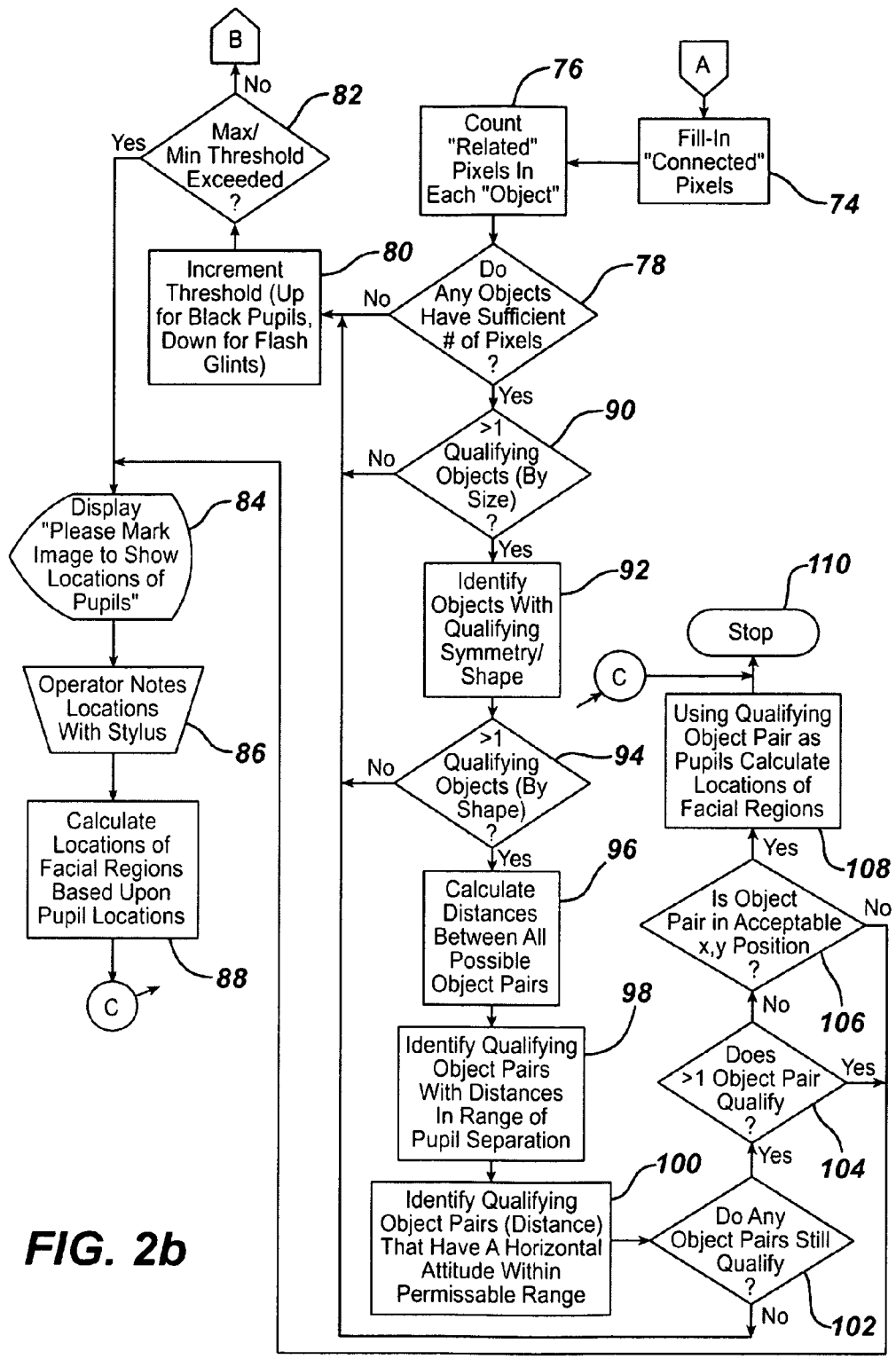
Figure 3:
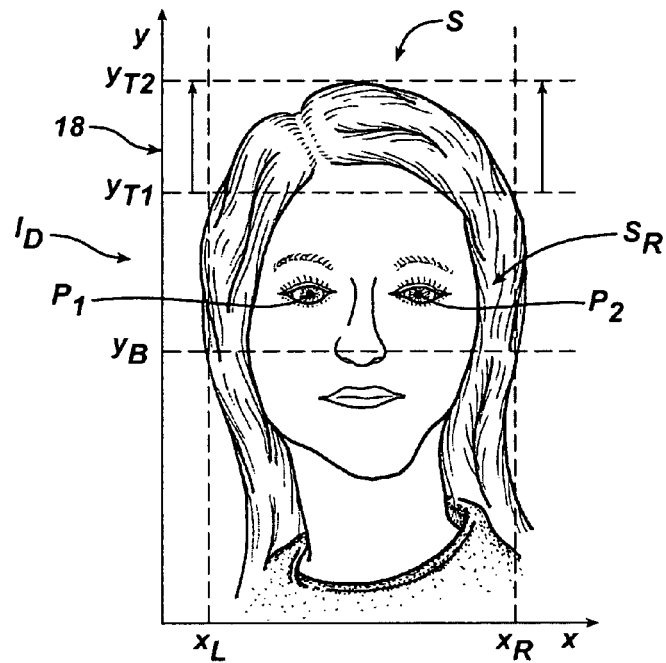
FIG. 3 is a schematic representation of the process of "sub-recting" an image.

The present invention allows the location of the pupils $P_1$, $P_2$ of a subject S in an image I to be located. FIGS. 2a and 2b are portions of a flowchart showing an exemplary process for doing so. At the start 50 of the process, the subject S is positioned and a digital photograph is taken 52 (see FIG. 1 where the subject S is positioned before the digital camera 12). After the photograph has been taken, the digital photograph data is loaded 54 into the computer 14. From the photographic image data $I_D$ (see FIG. 3) a subset image area or sample region $S_R$ is selected 56. The sample region $S_R$ is an area in the image data $I_D$ where there is a high probability that the pupils will be located. FIG. 3 illustrates that a properly positioned subject S will substantially fill the field of view of the camera 12 and the corresponding image data $I_D$, the pixels of which are arrayed on an X Y grid 18. A sample region $S_R$ may be defined which exhibits a high probability of containing the image of the pupils $P_1$, $P_2$. This is due to human physiology, viz., the pupils $P_1$, $P_2$ will reside in the upper half of the image, i.e., above line $Y_B$ and below line $Y_{T1}$. With a properly positioned subject, the pupils $P_1$, $P_2$ will be present between left and right margin lines $X_L$, $X_R$. In the event that the pupils are not located within the predefined sample region $S_R$, the limits of the sample region $S_R$ can be moved to examine additional areas of the image data $I_D$. For example, the upper limit of the sampled region $S_R$ could be moved to line $Y_{T2}$. The purpose of selecting a smaller, subset image area to look for the pupils $P_1$, $P_2$ is to reduce the amount of time necessary to find the pupils by reducing the number of pixels that need to be examined and analyzed as shall be described below. This process of selecting a rectangular subset sample region $S_R$ is sometimes referred to as "sub-recting" or "cropping". A similar rationale motivates the selection 57 of a sub-sample of pixels within the sample region $S_R$ for testing. The process of selecting a sub-sample is merely skipping every N pixels in the horizontal and/or vertical direction. For example, if only one of every five pixels in the sample region $S_R$ is tested/analyzed, the analysis time is reduced to one-twenty-fifth the amount of time to test all pixels. The present invention can be utilized by searching 58 for black pupils which offer no reflection of light or by searching 64 for flash glints (reflections off the cornea which are very closely associated with the pupils, which reflect the light illuminating the face.) The appropriate method would depend on the orientation of the subject S relative to the camera 12, i.e., positioned at an angle at which either reflection or no reflection occurs. The present invention can utilize either/both of the methods, e.g., sequentially, in the event that the first method does not find the pupils. Alternatively, the subject can be positioned at angle relative to the flashes that will provide a high probability of either black pupils (with no reflection) or flash glints (with reflection). In the case of black pupils (no reflection), the pixel qualification threshold is initialized 60 to the minimum value, i.e., corresponding to black. (Each pixel in the image data $I_D$ has a corresponding intensity represented initially by a voltage which is induced in a solid state capacitor corresponding to a pixel by light impinging on the capacitor. This voltage is digitized to a numeric value.)

Figure 4:
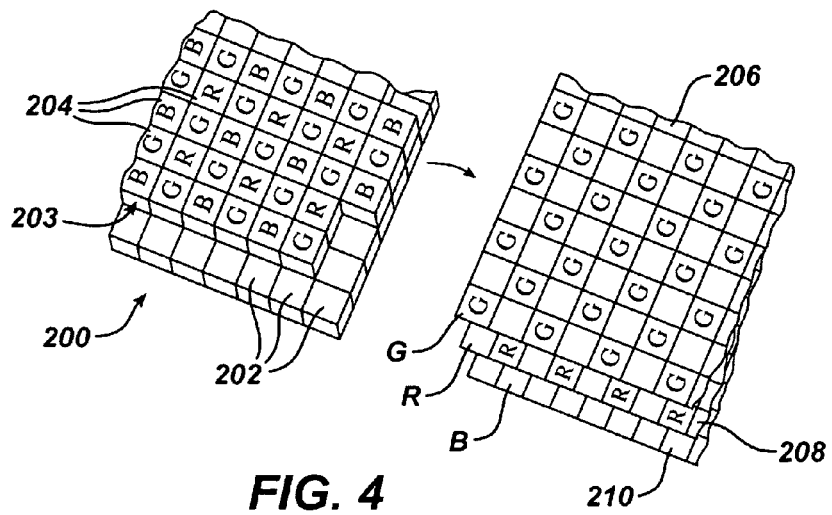
FIG. 4 is a schematic representation of a CCD/filter array and the image data produced hereby.

FIG. 4 illustrates an array of light sensitive elements, such as a CCD array 200 with a plurality of sensor elements 202 corresponding to pixels. The CCD array 200 has a Bayer filter 203 with a plurality of filter elements 204 in alternating colors: red, green and blue (R, G, B). The outputs of the plurality of light sensor elements 202 can be resolved into three discrete color grids/channels: green image data 206, red image data 208 and blue image data 210. Referring back to FIG. 2a, the process of selecting 62 the red channel image 208 (from the sub-rected and sub-sampled image subset) for analysis has the same effect as "sub-recting" 56 and "sub-sampling" 57, viz., it reduces the number of pixels to be analyzed and the analysis time (by two thirds), and is referred to as "sub-planing". The red channel image 208 also exhibits better resolution of the pupils than the blue or green channels.

In the event that flash glints or reflections from the pupils 64 are utilized to discern the pupils, the RGB image is converted 66 to L*a*b* color space. This can be done by known algorithms. The conversion 66 is conducted because the reflected flash glints are more readily distinguished in the L* axis image data which expresses brightness/darkness than in any of the color channels of an image expressed in RGB format. After conversion 66, the pixel qualification threshold is initialized 68 to the maximum, i.e., the value corresponding to white light of the highest intensity registered by the pixels 202 in the CCD array 200. In an analogous fashion to the separation of RGB image data, into red, green and blue channels, after conversion 66 of an RGB image into L*a*b* color space the L* channel or "sub-plane" may be selected 70 to test the pixels in that image data subset after being processed by a square convolution filter. A square convolution filter is used because the flash glint is square in shape. Having set the specific threshold for the pixels either for black pupils or flash glints, each pixel within the tested pixel sample subset is compared 72 to the threshold value to identify "qualifying" pixels, i.e., those pixels which are either equal to or less than the threshold in the case of the black pupils or equal to or greater than the threshold in the case of flash glints.

Figure 5A:
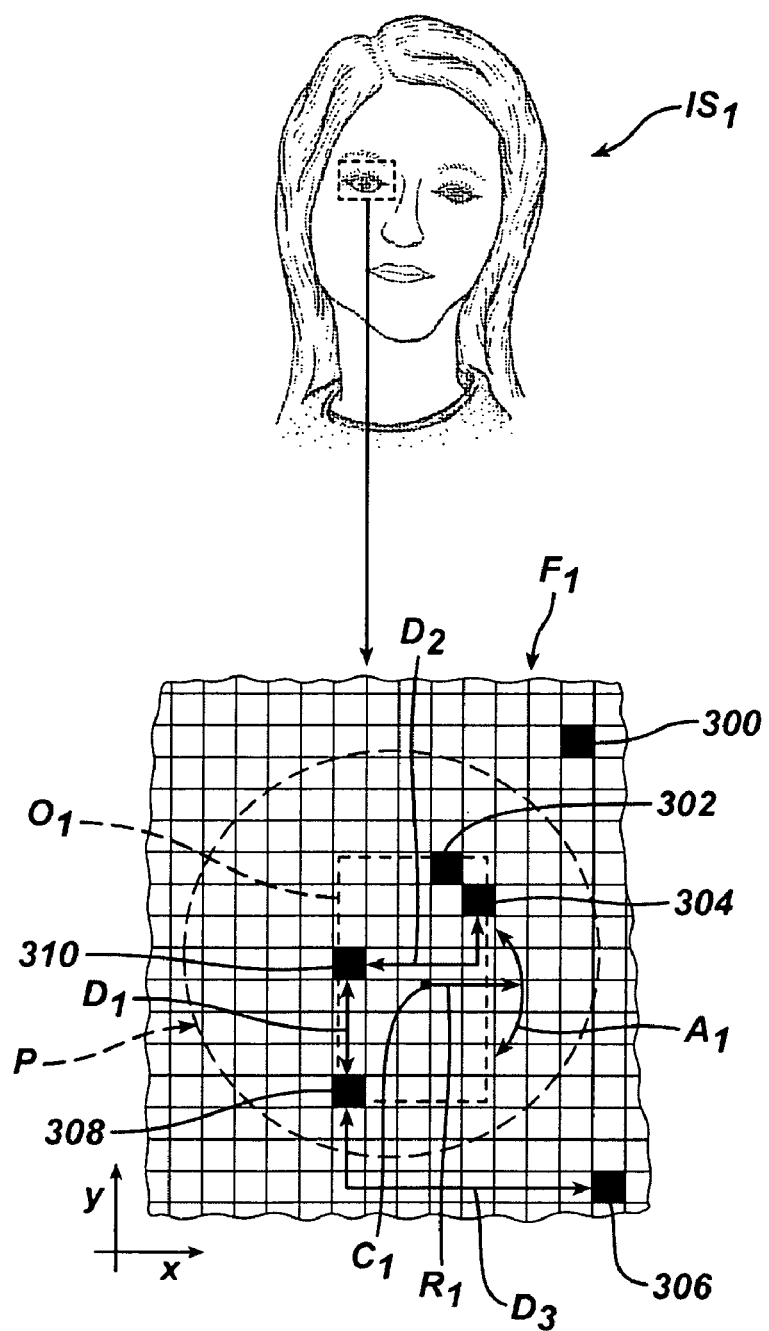
FIGS. 5a-5c are schematic representations of the process of "thresholding".
Figure 5B:
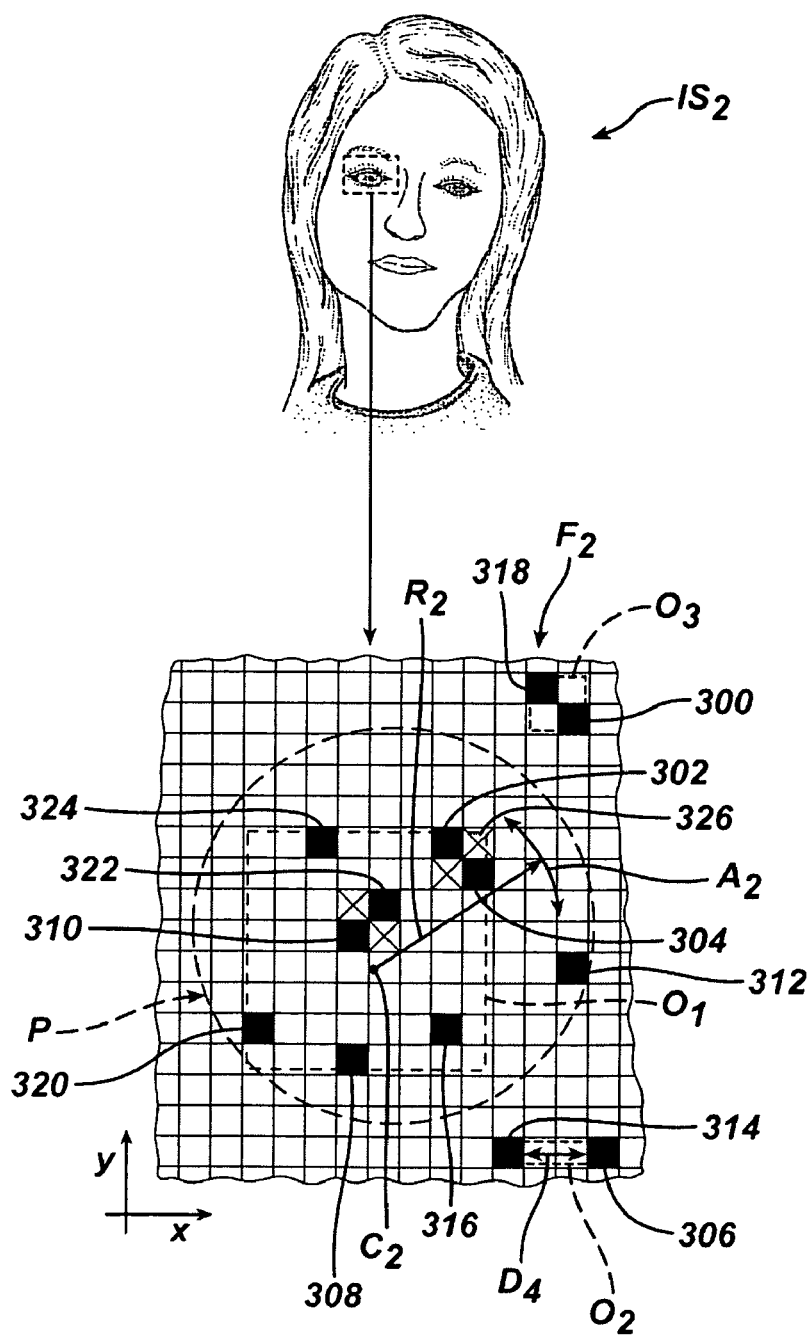
Figure 5C:
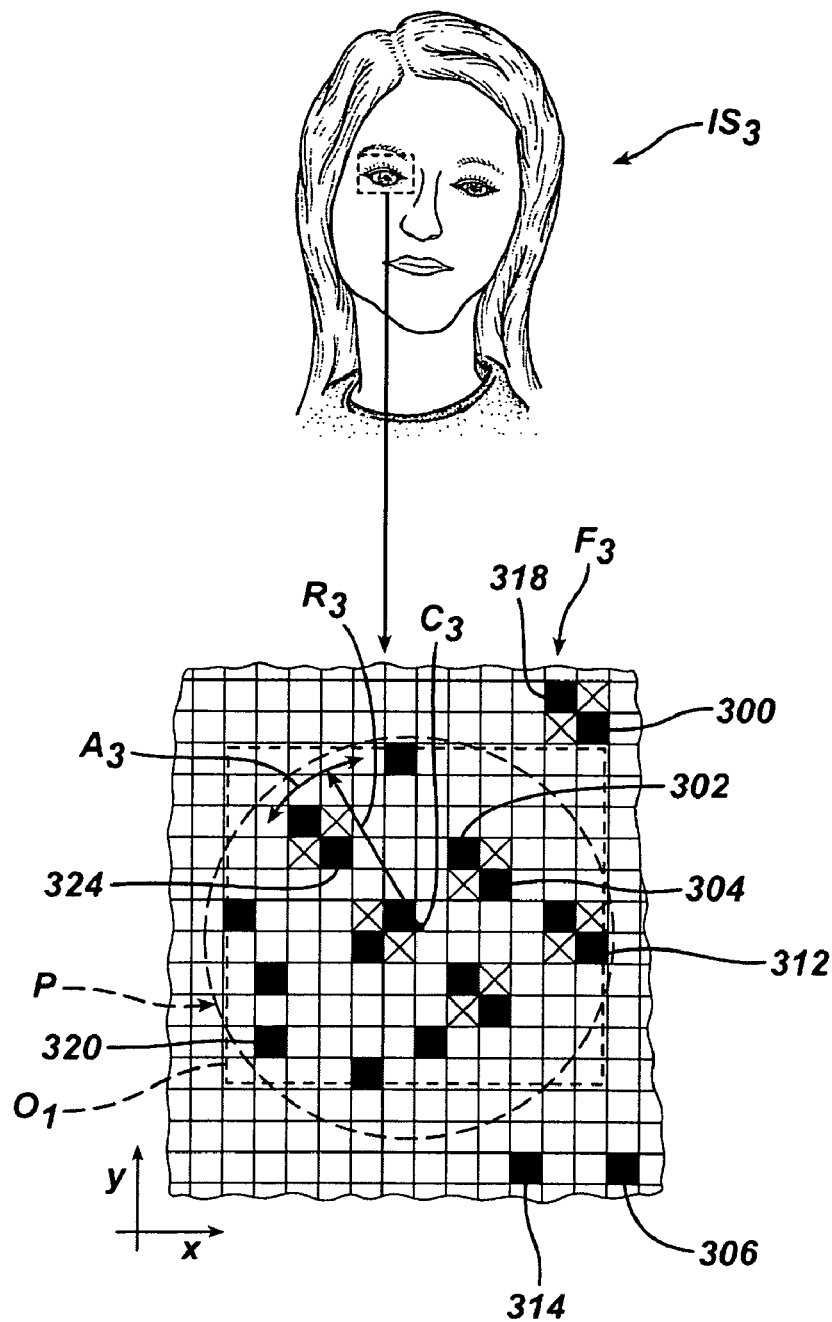

FIGS. 5a through 5c illustrate of the process appearing in the flow chart shown in FIGS. 2a and 2b. Referring to FIG. 5a, the result of the comparison 72 of each pixel in the sample set to the threshold results in the identification of "qualifying" pixels. An enlarged fragment $F_1$ of the image $IS_1$, shows the qualifying pixels near one of the eyes of the subject. Pixels 300, 302, 304, 306, 308 and 310 all qualify by passing the threshold test, e.g., in the case of black pupils, each of these pixels would be at or below the established current threshold. The image subset $IS_1$, in FIG. 5a is incomplete to illustrate the image that would result from displaying only qualifying pixels at the lowest threshold in the case of black pupils or the highest threshold used when testing for flash glints 64. The process of testing for qualifying pixels does not require the display of the resultant qualifying pixels, since they can be identified based upon their intensity value, but FIGS. 5a-5c are useful in visualizing this process. In FIG. 5a, the qualifying pixels are spatially related in that they have a specific distance of separation in the X and Y directions, e.g., pixels 308 and 310 are separated by a distance $D_1$ of three pixels in the X direction. With respect to pixels 304 and 310 there is a distance $D_2$ of four pixels in the X direction and 1 pixel in the Y direction for a total of 5 pixels distance. This illustrates one measuring convention. Alternatively, this measurement could readily be converted to a diagonal straight line measurement by calculating the length of the hypotenuse of the X and Y distances between the respective pixels. Pixels 302 and 304 are adjacent or "connected" pixels sharing a vertex between them. One can define "connected" pixels to be ones that share a common side or vertex, such as pixels 302 and 304. Having established this definition, one can identify and "fill-in" 74 (FIG. 2b) "connected" pixels that would otherwise not qualify based on light intensity value as is shown FIG. 5b, i.e., characterize them as qualifying pixels. For example, with respect to pixels 302 and 304 which are defined as being "connected", pixel 326 represents a connected pixel which is "filled-in" and therefore has a "qualifying" status. Having established criteria for "qualifying" pixels, i.e., based on intensity, and connectedness, qualifying pixels can then be tested for "relatedness". For example, a pixel can be determined to be "related" to another pixel if it is within a specified distance Dx from the other pixel. The concept of "relatedness" can then be utilized to define "objects" (or "blobs"—binary large objects), viz., an "object" can be defined as which are having a minimum number of related qualifying pixels. The number of qualifying pixels in each object can then be counted 76 to determine the size of each "object". For example, we can utilize a relatedness test that the pixels are within 5 pixels distance cumulatively, in the X and Y directions, define an "object" as having 2 or more "related" pixels and the boundary of each of the objects can be defined as that boundary which encloses all related pixels. FIG. 5a illustrates a first object $O_1$ (dashed rectangle) containing pixels 302, 304, 308 and 310 each of which are separated by less than or equal to 5 pixels in the X and/or Y directions from at least one other pixel in the object $O_1$. Pixels 300 and 306 qualify relative to the threshold, but are not close enough to other pixels to be related to them to constitute an "object". Given an "object" comprised of "related" "qualifying" pixels, the number of pixels can be counted 76 and this count can then be compared to a given size criterion to determine 78 if any objects have a sufficient number of pixels to be considered indicative of pupils. For example, it may be empirically determined that at least 50 pixels must qualify within a single object in order to be a reliable indicia of pupil identification. In the event 78 that the object does not have a sufficient number of pixels, the threshold for qualification is incremented 80 (for black pupils, the threshold is increased and for flash glints the threshold is lowered). Incrementation 80 of the qualification threshold permits additional pixels to qualify on the next testing sequence. This process of progressively incrementing/decrementing the threshold criteria is known as "thresholding". For any given threshold value, if a pixel passes the test, it is given a value of "1", if it fails, a value of "0".

A test is conducted 82 as to whether a maximum or minimum testing threshold has been exceeded without the identification of the pupils. For example, when testing for black pupils, if the threshold is incremented up to a level beyond which pupils may be reliably identified, such as an intensity value associated with light grey or white, then the reliable testing range has been exceeded without identifying the pupils. If the maximum or minimum testing threshold has been exceeded, then the automatic identification of pupils has failed and a back up procedure is conducted. Namely, a message is displayed 84 to the operator to manually mark the image to show the location of the pupils. The human operator can then locate the pupils and indicate their location, e.g., by means of positioning the arrow cursor and double clicking or by touching a stylus to a touch screen display at the location where the pupils are shown. Accordingly, at step 86, the operator notes the location of the pupils, e.g., with a stylus. Given the identification of pupil location, the locations of the various facial regions of interest can then be calculated 88 relative to the pupils. The process is then stopped 110.

If at step 82 the testing threshold has not been exceeded, then comparison 72 proceeds to identify additional qualifying pixels. After additional testing 72 and incrementation 80 of the threshold, more and more pixels should qualify from the image subset $IS_X$. Referring to FIG. 5b, the fragment $F_2$ of the image data subset $IS_2$ has more qualifying pixels than were identified in FIG. 5a. In FIG. 5b, the addition of more qualifying pixels, e.g., 314 and 318 has given rise to the existence of additional objects, viz., $O_2$ and $O_3$. Furthermore, the original object $O_1$ has changed in shape and size. Because the present invention relies upon the identification of two pupils to provide sufficient information in order to calculate the locations of the facial regions of interest, at step 90 (FIG. 2b) inquiry is made as to whether more than one qualifying object has been discerned (i.e., qualifying by size). If not, then the threshold is incremented 80, tested for exceeding maximum or minimum threshold 82 and then further comparison 72 is conducted. In the eventuality that more than one qualifying object (by size) exists, then each of the objects is tested to identify 92 those objects with a qualifying symmetry/shape. Since the pupils are round, the objects tested should approximate a round shape in order to be indicative of pupils. The problem of identifying shapes in images has been encountered in the past and solutions exist in the public domain. For example, the programming language IDL by ITT Visual Systems or Image Pro by Media Cybernetics have modules for determining the symmetry of an object or "blob", i.e., for identifying a round object utilizing morphometrics. For purposes of illustrating a simple test for shape, FIGS. 5a-5c show a positional center, $C_1$ of an Object $O_1$, which may be determined by taking the averages of the X and Y coordinates of each of the related pixels of the object. As the object $O_1$ grows (in FIGS. 5b and 5c) the center $C_1, C_2, C_3$ moves, such that it more closely approximates the center of pupil P. An average radius $R_1, R_2, R_3$ associated with each $C_1, C_2, C_3$ can be calculated by averaging the distance from the center, e.g., $C_1$ to the boundary line of the object $O_1$ in the X and Y directions. "Roundness" can then be tested by determining the percentage of pixels contained within the circle formed by rotating the radius, e.g., $R_1$ about center $C_1$ (as shown by arcs $A_1, A_2, A_3$). The percentage criteria can be determined empirically, i.e., that percentage which is predictive of roundness. Clearly, 100% would be predictive, but a lesser percentage, e.g., 80% may accurately predict roundness. Alternatively, the object shape, e.g., object $O_1$ of FIG. 5c, can be tested to ascertain if it approximates a square (within a given tolerance range). The existence of a square object, e.g., $O_1$ is predictive of roundness.

At step 94, a test is made as to whether there are more than one qualifying objects by shape. If not, then the threshold is incremented 80 and testing 72 resumes because two pupils need to be identified. If there are more than one qualifying objects (by shape), the distances between all possible object pairs is then calculated 96. Those object pairs with distances in the range of pupil separation are identified 98 and tested at step 100 to identify qualifying object pairs that have a horizontal attitude within a permissible tolerance range of tilt (to allow for head tilting). If 102 no object pair(s) still qualifies, then the process of incrementing 80 and testing 72 is repeated. If 104 more than one object pair qualifies, then automatic pupil identification has failed due to the fact that the testing cannot discern between the pupils and another pair of objects which are not pupils. In the eventuality that only one object pair qualifies, then the qualifying object pair is tested 106 to see if it is in an acceptable X and Y position, i.e., that the pupils are not too far to the left or the right, or too far towards the top or bottom of the image. Otherwise, the tester would be required to either mark the pupils manually 84 or retake the image due to the improper positioning of the subject. In the eventuality that the object pairs are in an acceptable X, Y position, then the object pair can be identified as pupils and the X,Y locations thereof used to calculate 108 the location of the facial region(s) $R_1$, $R_2$ ... of interest, leading to the end 110 of the process. As noted above, facial regions may be defined as polygons where the position of each vertex is expressed relative to the facial center at a distance some fraction or multiple of the semidistance. In this manner, the facial regions that are calculated will be different for persons with different head sizes, assuming that such differences lead to different pupil/glint locations (and correspondingly different semidistances). Because each pupil/glint location is calculated independently and expressed relative to the facial center, head tilt and rotation will be reflected in the calculation of the location of the regions of interest that are similarly tilted/rotated. As a result, the present invention provides automatic compensation for head tilt. In accordance with the present invention, facial regions can be determined automatically from digital images without human intervention or assistance or relying on fiducial landmarks. The process is fast, e.g., being completed in about 0.2 seconds, and reproducible, each region being calculated independently so the calculated facial regions are automatically adjusted for different head sizes, locations, tilt and rotation. Features contained within the identified facial regions, can then be analyzed, e.g., using multiple image illumination types, as disclosed in applicants' co-pending U.S. patent application Ser. No. 10/978,284 entitled "Apparatus for and Method of Taking and Viewing Images of the Skin," which was published as United States Patent Application Publication No. US 2005/0195316 A1 ("U.S. Publication No. 2005/0195316"), and is incorporated by reference herein in its entirety.

The foregoing discloses an exemplary apparatus and method for identifying pupils and facial regions in an image. Various modifications of the disclosed invention could be made without departing form the scope of the present invention. For example, the definition of "related" pixels could include pixels at a greater or lesser distance and/or the order of testing constraints changed. For example, object pair attitude may be tested before object pair separation distance. The claims of the present application, when submitted, are intended to cover all such variations and modifications.

We claim:

1. A method for identifying a facial region of a person in a digital image having a set of pixels, comprising the steps of: (A) testing a plurality of the pixels of the image to identify those pixels associated with the imaging of pupils of the person by quantitatively comparing a value associated with the pixels tested which is indicative of intensity to an intensity criteria value indicative of pupil imaging to identify qualifying pixels, which are potentially predictive of pupil imaging pixels, the intensity criteria value determined by selecting a first intensity criteria value most closely predictive of pupil imaging followed by testing against the first intensity criteria value to ascertain if pupils have been identified in the digital image and if not, then conducting thresholdinq by iteratively incrementally adjusting the first intensity criteria value such that it is progressively less indicative of pupil imaging, testing the pixels and repeating until qualifying pixels are identified or a terminal intensity criteria value is reached: (B) grouping qualifying pixels into objects based upon a spatial relationship between qualifying pixels and counting the number of objects to ascertain if at least two objects have been identified and if not, adjusting the intensity criteria value and testing pixels to identify additional qualifying pixels: (C) testing the objects to ascertain that the objects have a size predictive of pupil imaging and if not, adjusting the intensity criteria value and testing pixels to identify additional qualifying pixels: (D) calculating a location of the facial region in the image based upon the location of the pupils identified in step (A).

2. The method of claim 1, further comprising the step of testing the objects to ascertain that the objects have a shape predictive of pupil imaging and if not, to continue to test pixels to identify additional qualifying pixels.

3. The method of claim 2, further comprising the step of testing the objects to ascertain that the objects have a spacing predictive of pupil imaging and if not, to continue to test pixels to identify additional qualifying pixels.

4. The method of claim 3, further comprising the step of testing the objects to ascertain that the objects have an orientation within the digital image predictive of pupil imaging and if not, to continue to test pixels to identify additional qualifying pixels.

5. The method of claim 2, wherein said step of testing object shape is conducted through morphometrics.

6. The method of claim 1, further comprising the step of identifying non-qualifying pixels that are related spatially to qualifying pixels, such that considering such non-qualifying, related pixels as qualifying would generally increase the likelihood that an object containing the otherwise non-qualifying, related pixels will be predictive of pupil imaging.

7. The method of claim 1, further comprising the step of sub-recting by restricting testing to a subset of pixels based upon empirically established increased probability of pupils being located in a specific sub-area in the digital image.

8. The method of claim 1, further comprising the step of sub-sampling by restricting testing to every $N_{th}$ pixel to reduce the number of pixels tested.

9. The method of claim 1, further comprising the step of sub-planning by restricting testing to a single color channel.

10. The method of claim 9, wherein the color channel is red.

11. The method of claim 1, wherein the intensity criteria value is associated with color absence/blackness.

12. The method of claim 1, wherein the intensity criteria value is indicative of brightness.

13. The method of claim 12, wherein the value associated with the pixels tested which is indicative of intensity and the intensity criteria value are both expressed as L* magnitude in L*a*b* color space before comparison.

14. The method of claim 1, wherein the calculation of the location of the facial region is based upon the interpupilary distance and empirical population data relevant to the person.

15. The method of claim 1, further comprising the step of analyzing the image of the facial region to ascertain a condition of the skin of the person other than color alone.

16. A method for identifying a facial region of a person in a digital image having a set of pixels, comprising the steps of: (A) sub-recting by selecting a subset of the set of pixels based upon empirically established increased probability of pupils being located in a specific sub-area in the digital image; (B) sub-sampling by selecting every $N_{th}$ pixel of the sub-rected subset; (C) sub-planing by selecting pixels in a single color channel of the sub-rected, sub-sampled subset to yield a subset St of pixels to be tested; (D) selecting an initial criteria pixel intensity value predictive of pupil imaging; (E) quantitatively comparing the pixel intensity value associated with each of the pixels in subset St to the criteria pixel intensity value to identify qualifying pixels, which are potentially predictive of pupil imaging; (F) grouping qualifying pixels into objects based upon a spatial relationship between qualifying pixels and counting the number of objects to ascertain if at least two objects have been identified and if not, jumping to step (K), otherwise continuing at step (G); (G) testing the objects to ascertain that the objects have a size predictive of pupil imaging and if not, jumping to step (K), otherwise continuing at step (H); (H) testing the objects to ascertain that the objects have a shape predictive of pupil imaging and if not, jumping to step (K), otherwise continuing at step (I); (I) testing the objects to ascertain that the objects have a spacing predictive of pupil imaging and if not, jumping to step (K), otherwise continuing at step (J); (J) testing the objects to ascertain that the objects have an orientation within the digital image predictive of pupil imaging and if so, jumping to step (N), otherwise continuing at step (K); (K) identifying non-qualifying pixels that are related spatially to qualifying pixels, such that considering such non-qualifying, related pixels as qualifying would generally increase the likelihood that an object containing the otherwise non-qualifying, related pixels will be predictive of pupil imaging; (L) adjusting the criteria intensity value such that it is less indicative of pupil imaging, but not outside of a predetermined value limit range; (M) repeating steps (E) to (L) until the tests described in steps (G) to (J) are satisfied, and if so, continuing at step (N), or upon exceeding the predetermined value limit, triggering a message and terminating the method; (N) calculating a location of the facial region in the image based upon the location of the pupils identified.

\* \* \* \* \*